"# United States

Tomilov et al.

[11] 3,921,441
[45] Nov. 25, 1975

[54] ACOUSTIC HEAD

[76] Inventors: Boris Vasilievich Tomilov, ulitsa Chkalova 9, kv. 74, Khabarovsk; Jury Nikolaevich Olshvang, ulitsa Furmanova 46, kv. 41; Ljudmila Ivanovna Kozhevnikova, ulitsa Kamenotesov, 2, kv. 101, both of Sverdlovsk, all of U.S.S.R.

[22] Filed: Nov. 13, 1973

[21] Appl. No.: 415,378

[52] U.S. Cl. .............................. 73/71.5 US; 310/9.1
[51] Int. Cl.² ......................................... G01N 29/00
[58] Field of Search ......... 73/71.5 US, 67.5 R, 67.6, 73/67.7, 67.8 R; 310/8.1, 8.7, 9.1; 116/137 A

[56] References Cited
UNITED STATES PATENTS

| | | | |
|---|---|---|---|
| 2,458,288 | 1/1949 | Moriarty | 73/71.5 US |
| 2,460,153 | 1/1949 | Smoluchowski | 310/8.7 |
| 2,488,290 | 11/1949 | Hansell | 73/71.5 US |
| 2,601,779 | 7/1952 | Firestone | 73/67.8 R |
| 3,754,435 | 8/1973 | Zeutschel | 73/67.8 R |
| 3,789,656 | 2/1974 | Miller | 73/67.8 S |

*Primary Examiner*—Richard C. Queisser
*Assistant Examiner*—Stephen A. Kreitman
*Attorney, Agent, or Firm*—Haseltine, Lake & Waters

[57] ABSTRACT

The acoustic head is intended for ultrasonic measurement at non-destructive testing and quality control of solid bodies and articles.

The herein disclosed head includes, in addition to an electromechanical transducer, e.g. a piezoelectric one, shock-damping means, protector and means for pressing the transducer to a test object, an electric motor (7) mounted in the housing (1) of the head, an eccentric (9) mounted on the shaft (8) of the motor and engaging the holder (3) of the transducer through a groove (10) made in this holder.

When the electric motor (7) is supplied with electric power, the structure of the head provides for generating specified vibratory oscillation of the transducer (2) relative to the housing (1), and when the head is applied to a test object, this oscillation is effected relative to this object, the vibration of the transducer (2) being effected under conditions of high-quality acoustic contact, with easily reproduced parameters.

4 Claims, 3 Drawing Figures

U.S. Patent  Nov. 25, 1975  3,921,441
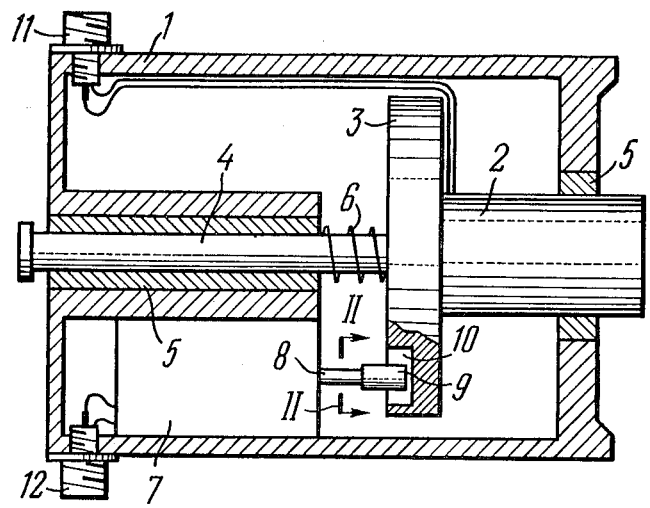
FIG.1
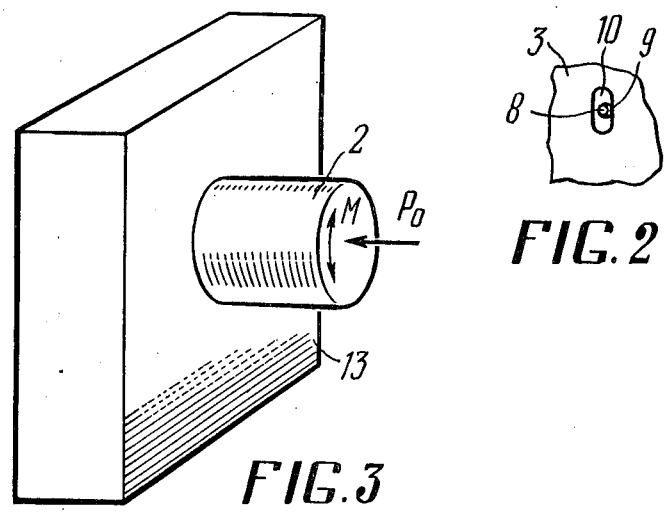
FIG.2
FIG.3

3,921,441

ACOUSTIC HEAD

The present invention relates to techniques of measurements, and, more particularly, it relates to an acoustic head employed at ultrasonic measurements in solid bodies.

The present invention may be used to utmost advantage at non-destructive testing and quality control at production of various construction materials and other articles.

There are known contact-type acoustic heads including an electromechanical transducer, a shock damping means, a protector or a protective layer and a housing, the transducer being rigidly secured relative to the housing of said head.

Furthermore, there are known contact-type measuring heads for similar applications, including, in addition to the abovelisted components, an elastic film and an immersion medium (e.g. water, oil, etc.) received between this film and the transducer.

The operation performed with such a head at testing of materials and articles is practically the same with all types of heads. An acoustic head is placed onto the surface of a test object, prepared in advance, and is urged to this surface with an external effort, usually, by the operator's hand.

Then the operator performs several grinding-in motions of the head relative to the test object, whereafter the parameters of the measurement signal are measured.

In some cases the pressing-down effort of the operator's hand is replaced by the holding-down effort of a specially provided spring mounted on an additional device, while the grinding-in motions performed by the operator are replaced by transmission of vibratory oscillation from an external source of vibration, e.g. a magnetostrictive transducer, which is also an additional device with respect to the acoustic head.

The employment of these additional devices with acoustic heads is essential for obtaining high-quality acoustic contact; however, in these cases the system for obtaining this acoustic contact is bulky, operation of this system is complicated, as well as its handling, and the testing procedure consumes more labour.

Besides, the necessity of employing for testing these additional devices to hold down the head and to effect its vibration means that the users of ultrasonic equipment should employ specialists for development and maintenance of complicated equipment and tools.

It is an object of the present invention to create an acoustic head which should provide for high quality of ultrasonic measurement.

It is also an object of the present invention to create an acoustic head which should provide for stable high-quality acoustic contact of the transducer with the test object.

It is another object of the present invention to create an acoustic head wherein the vibrator should be mounted in the housing of the head, with minimal dimensions of the head.

It is still another object of the present invention to create an acoustic head, which should provide for introducing automation into the process of testing articles, i.e. for automatically performed check-up of serially produced articles.

These and other objects are attained in an acoustic head for ultrasonic measurement at non-destructive testing of solid materials and articles, comprising a housing with the holder of an electromechanical transducer and means for urging said transducer to a test object with a predetermined effort, in which acoustic head, in accordance with the invention, there is an electric motor mounted in said housing and having an eccentric mounted on the shaft thereof, said holder of said transducer having a groove made therein, said eccentric being arranged to slide along the walls of said groove, said holder of said transducer being movably mounted in respect of said housing, whereby interaction of said eccentric and said holder results in vibratory oscillation of said transducer relative to a test object.

The herein disclosed acoustic head provides for effecting ultrasonic measurement with high quality and minimal amount of labour consumed by the process of measurement; it ensures highly dependable results of evaluation of the quality of an article.

The structure of the acoustic head provides for small dimensions of the head and offers ready control of the parameters of vibration of the transducer (i.e. both the frequency and the amplitude of this vibration), to adjust the head to the actual conditions of testing, whereby there is obtained easily reproduced acoustic contact of a high quality.

Other objects and advantages of the present invention will become apparent from the following detailed description of an embodiment thereof, with reference being had to the accompanying drawings, wherein:

FIG. 1 is a longitudinally sectional view of the acoustic head embodying the invention;

FIG. 2 is a sectional view along line II—II of FIG. 1;

FIG. 3 schematically illustrates oscillation of the transducer of the acoustic head at testing of an object.

FIG. 1 of the appended drawings depicts the main components of the acoustic head embodying the invention.

The housing 1 of the head receives therein an electromechanical transducer 2 mounted on a disc-shaped holder 3 incorporating a guide rod 4. The housing has mounted therein guiding sleeves 5 in which the holder 3 with the transducer 2 is movable in respect of the housing 1. The guiding sleeves 5 and the guide rod 4 limit the motion of the transducer 2 to that strictly in the direction of its permissible motion and vibration.

The holder 3 is spring-biased in the direction of reciprocation of the transducer 2 by a spring 6 mounted about the guide rod 4, to ensure permanent contact effort.

There is mounted on the internal wall of the housing 1 a miniature electric motor 7 with a shaft 8 carrying thereon an eccentric weight 9. The holder 3 has made therein a groove 10 extending radially of the holder. The eccentric 9 is received in this groove 10.

FIG. 2 of the appended drawings illustrates a sectional view of the shaft 8 of the motor 7 and the engagement of the eccentric 9 with the holder 3 via the walls of the groove 10.

To feed out the output signal of the transducer, the head is provided with a high-frequency electric terminal 11, while a terminal 12 is provided for power supply of the electric motor from an external source.

The herein disclosed acoustic head operates, as follows.

A layer of contact lubricant is applied onto the surface of a test object, prepared in advance, whereafter the housing 1 is tightly pressed by hand against the object. The transducer is thus brought into a direct contact with the test object with an effort determined by the effort of the compressed spring 6.

The electric motor 7 is connected to the power supply, and the shaft 8 thereof starts rotating with the eccentric 9.

The rotating eccentric 9 slides in engagement with the walls of the groove 10 of the holder 3, whereby the holder 3 and the transducer 2 are driven through vibratory oscillation about the axis of symmetry of the transducer 2, the frequency of the vibration being defined by the angular speed of the electric motor 7, while the amplitude thereof is defined by the eccentricity of the eccentric 9.

FIG. 3 of the appended drawings illustrates the directions M of the vibratory motion of the transducer relative to a test object 13, as well as the direction of the contact pressure effort $P_o$ with which the transducer is urged to the object 13.

The herein disclosed structure of an acoustic head simplifies control of the parameters of the vibration of the transducer. The frequency of this vibration can be controlled within a wide range by varying the voltage of the power supply of the electric motor 7, while the amplitude thereof can be adjusted by making the eccentric 9 conical and providing for adjustment of the extent to which it is inserted into the groove 10 of the holder 3.

This possibility of controlling the parameters of the vibration renders the herein disclosed acoustic head an all-purpose one, perfectly suitable for operation with various test objects, types and kinds of contact media, within a broad range of climatic and external mechanical conditions of testing.

The herein disclosed acoustic head, unlike the hitherto known ones, provides for introducing automation into the process of ultrasonic testing of articles directly at serial manufacture of such articles; it also opens possibility for implementing 100 per cent testing of the quality of the articles.

What is claimed is:

1. An acoustical ultrasonic transducer head for the non-destructive testing of solid articles, comprising a housing, a holder member for a transducer mounted slidably in said housing, a transducer carried fixedly and coaxially by said holder member, said holder member being provided with a radially extending groove in the face thereof, spring means positioned within said housing adapted to bias said holder member and said transducer carried thereby outwardly of said housing, motor means carried by said housing provided with a rotatable shaft, and an eccentric member mounted on said shaft adapted to ride within said radial groove whereby operation of said motor effects the movement of said eccentric member within said radial groove and the consequent cyclical arcuate movement of said transducer relative to the surface of said article without shifting the center of the transducer from a predetermined point on the surface of said article.

2. An acoustical ultrasonic transducer head according to claim 1, wherein said holder member comprises an annular disc portion and an axially extending central guide rod, said housing being provided with a guide sleeve dimensioned to slidingly receive said guide rod in supporting relation.

3. An acoustical ultrasonic transducer head according to claim 2, wherein said motor is mounted within said housing such that the rotatable shaft thereof is parallel to said guide rod.

4. An acoustical ultrasonic transducer head according to claim 1, wherein said eccentric member is conical in configuration.

* * * * *